(12) United States Patent
Niwa et al.

(10) Patent No.: US 8,244,897 B2
(45) Date of Patent: *Aug. 14, 2012

(54) CONTENT REPRODUCTION APPARATUS, CONTENT REPRODUCTION METHOD, AND PROGRAM

(75) Inventors: Yoshikatsu Niwa, Kanagawa (JP); Tsunemitsu Takase, Tokyo (JP); Shinya Masunaga, Tokyo (JP); Tomoaki Takemura, Tokyo (JP); Akihiro Muto, Tokyo (JP)

(73) Assignee: Sony Corporation, Tokyo (JP)

( * ) Notice: Subject to any disclaimer, the term of this patent is extended or adjusted under 35 U.S.C. 154(b) by 197 days.

This patent is subject to a terminal disclaimer.

(21) Appl. No.: 12/180,402

(22) Filed: Jul. 25, 2008

(65) Prior Publication Data
US 2009/0055549 A1 Feb. 26, 2009

(30) Foreign Application Priority Data
Jul. 26, 2007 (JP) ................................. 2007-194926

(51) Int. Cl.
G06F 15/16 (2006.01)
G06F 15/173 (2006.01)
H04J 3/14 (2006.01)

(52) U.S. Cl. ......... 709/231; 709/233; 709/238; 370/235
(58) Field of Classification Search .................. 709/231, 709/233, 238; 370/235
See application file for complete search history.

(56) References Cited

U.S. PATENT DOCUMENTS

| | | | |
|---|---|---|---|
| 5,546,244 A | 8/1996 | Park et al. | |
| 5,606,422 A | 2/1997 | Yanagihara et al. | |
| 5,740,307 A | 4/1998 | Lane | |
| 5,923,812 A | 7/1999 | Sakazaki et al. | |
| 5,933,567 A | 8/1999 | Lane et al. | |
| 5,937,138 A | 8/1999 | Fukuda et al. | |
| 6,018,611 A | 1/2000 | Nogami et al. | |
| 6,064,794 A | 5/2000 | McLaren et al. | |

(Continued)

FOREIGN PATENT DOCUMENTS
EP 0 727 911 8/1996
(Continued)

OTHER PUBLICATIONS

Office Action mailed Jul. 27, 2010, in U.S. Appl. No. 12/204,784.

(Continued)

*Primary Examiner* — Mohamed Ibrahim
*Assistant Examiner* — Farrukh Hussain
(74) *Attorney, Agent, or Firm* — Finnegan, Henderson, Farabow, Garrett & Dunner, L.L.P.

(57) ABSTRACT

A content reproduction apparatus is provided for reproducing variable-speed content. The content reproduction apparatus includes a data acquisition section for obtaining first streaming data and second streaming data, wherein the first streaming data includes first reproduction time data indicating a time to reproduce the first streaming data at a first streaming speed, and wherein the second streaming data includes second reproduction time data indicating a time to reproduce the second streaming data at a second streaming speed. The content reproduction apparatus also includes a reproduction time acquisition section for calculating a third reproduction time according to the first reproduction time data, the second reproduction time data, and a relationship between the first streaming speed and the second streaming speed, the third reproduction time being a time to reproduce the first streaming data at the first streaming speed followed by the second streaming data at the first streaming speed.

21 Claims, 12 Drawing Sheets

U.S. PATENT DOCUMENTS

| | | | |
|---|---|---|---|
| 6,151,634 A | 11/2000 | Glaser et al. | |
| 6,173,322 B1 | 1/2001 | Hu | |
| 6,233,389 B1 | 5/2001 | Barton et al. | |
| 6,310,886 B1 | 10/2001 | Barton | |
| 6,327,418 B1 | 12/2001 | Barton | |
| 6,327,421 B1 | 12/2001 | Tiwara et al. | |
| 6,356,545 B1 | 3/2002 | Vargo et al. | |
| 6,643,083 B2 | 11/2003 | Korst et al. | |
| 6,697,432 B2 | 2/2004 | Yanagihara et al. | |
| 6,788,877 B1 | 9/2004 | Hoshi | |
| 6,965,724 B1 | 11/2005 | Boccon-Gibod et al. | |
| 7,212,727 B2 | 5/2007 | Senoh | |
| 7,593,620 B2 | 9/2009 | Surcouf et al. | |
| 7,743,183 B2 | 6/2010 | Virdi et al. | |
| 2002/0036856 A1 | 3/2002 | Korst et al. | |
| 2002/0118951 A1* | 8/2002 | Suzuki et al. | 386/68 |
| 2002/0118954 A1 | 8/2002 | Barton et al. | |
| 2003/0007780 A1 | 1/2003 | Senoh | |
| 2003/0051237 A1 | 3/2003 | Sako et al. | |
| 2003/0071971 A1 | 4/2003 | Jo | |
| 2003/0078930 A1 | 4/2003 | Surcouf et al. | |
| 2003/0179669 A1 | 9/2003 | Takahashi et al. | |
| 2004/0264930 A1 | 12/2004 | Yoo et al. | |
| 2006/0098741 A1 | 5/2006 | Unoki et al. | |
| 2006/0120243 A1 | 6/2006 | Kurita | |
| 2006/0120378 A1* | 6/2006 | Usuki et al. | 370/395.4 |
| 2006/0269221 A1 | 11/2006 | Hashimoto et al. | |
| 2006/0280444 A1 | 12/2006 | Kawakami et al. | |
| 2007/0011357 A1 | 1/2007 | Watanabe et al. | |
| 2007/0022208 A1 | 1/2007 | Hashimoto et al. | |
| 2007/0047910 A1 | 3/2007 | Chiba | |
| 2007/0071396 A1 | 3/2007 | Tanaka et al. | |
| 2007/0201819 A1* | 8/2007 | Sung et al. | 386/68 |
| 2007/0266411 A1 | 11/2007 | Yamamoto et al. | |
| 2008/0175563 A1 | 7/2008 | Yoon | |
| 2008/0195573 A1* | 8/2008 | Onoda et al. | 707/1 |
| 2008/0235742 A1 | 9/2008 | Osaki et al. | |
| 2008/0268771 A1* | 10/2008 | Masuda | 455/3.01 |

FOREIGN PATENT DOCUMENTS

| | | |
|---|---|---|
| JP | 9-37225 | 2/1997 |
| JP | 2005318250 A | 11/2005 |
| JP | 2007318532 A | 12/2007 |
| WO | WO 01/74076 | 10/2001 |
| WO | WO 2005062619 A1 | 7/2005 |

OTHER PUBLICATIONS

Reply to Office Action filed on Oct. 27, 2010, in U.S. Appl. No. 12/204,784.

Office Action mailed Jan. 19, 2011, in U.S. Appl. No. 12/204,784.

Amendment after final filed on Apr. 19, 2011, in U.S. Appl. No. 12/204,784.

Notice of Allowance mailed May 6, 2011, in co-pending U.S. Appl. No. 12/204,784.

Extended European Search Report dated Sep. 10, 2010, for EP application No. 08252958.

* cited by examiner

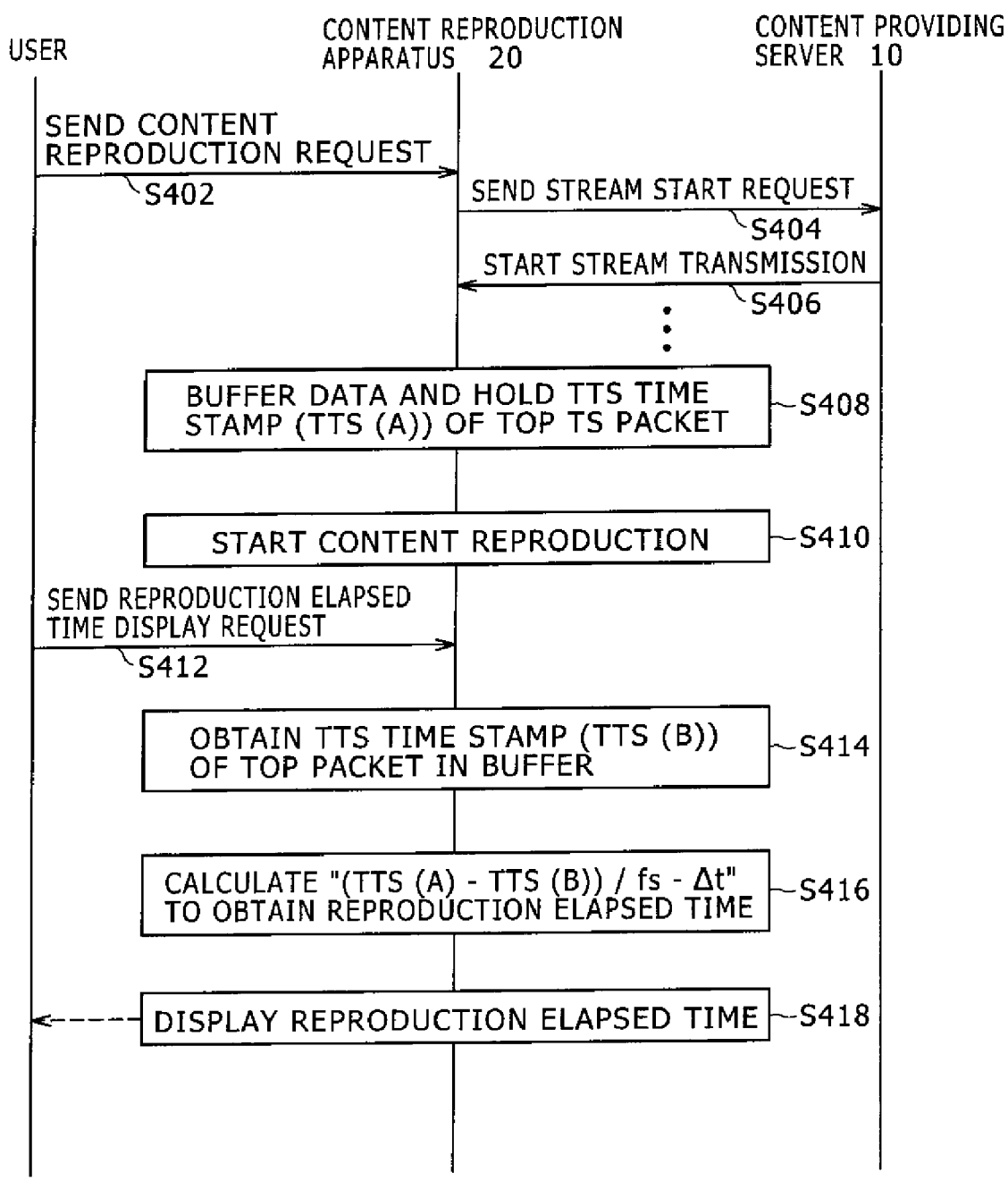

CONTENT REPRODUCTION APPARATUS, CONTENT REPRODUCTION METHOD, AND PROGRAM

RELATED APPLICATIONS

The present application claims priority from Japanese Patent Application JP 2007-194926 filed in the Japanese Patent Office on Jul. 26, 2007, the entire contents of which are incorporated herein by reference.

FIELD OF THE INVENTION

The present invention relates to systems and methods for obtaining a valid content reproduction time upon switching a speed of streaming data.

RELATED ART

In recent years, services have been proposed in which a content providing server sends contents to user terminals via an Internet Protocol (IP) network. For example, JP-A No. 9 (1997)-37225 describes a service in which a media server delivers moving image information to a terminal via a communication network. Examples of this service may include a download service and a streaming service (e.g. VoD streaming service). In the download service, a user terminal starts reproducing a content after all packets of the content are received from the content providing server.

On the other hand, in the streaming service, while the content providing server is sending streaming data of a content to the user terminal in response to a user's request, which is an on-demand service, the user terminal reproduces the content based on the streaming data that has been received so far. Further, a user can request the content providing server to perform operations such as fast forward, temporary stop, and variable-speed reproduction of the content, by using the user terminal. The content providing server may have normal-speed reproduction streaming data and variable-speed reproduction streaming data, and may switch the streaming data to be sent, from the normal-speed reproduction streaming data to the variable-speed reproduction streaming data, when a request for variable-speed reproduction is sent from the user.

The normal-speed reproduction streaming data includes a plurality of TS packets (transport packets). At the user terminal, the TS packets are combined to generate packetized elementary streams (PESs). Presentation time stamp (PTS) information indicates a time at which the content corresponding to the PES should be displayed on a display device. Moreover, the PTS may be specified in the header of each PES. For example, a time of an initial PES which is displayed at the start of reproduction of a content is specified in the PTS information for that initial PES. Therefore, the user terminal can calculate a content reproduction time from the difference between PTS information specified in the initial PES used at the start of the reproduction and PTS information specified in the PES currently being viewed.

However, the existing method of calculating a content reproduction time is based on the assumption that content is reproduced with normal-speed reproduction streaming data. Therefore, it may be difficult for the existing user terminal to calculate a valid content reproduction time when normal-speed content reproduction performed based on normal-speed reproduction streaming data is switched to variable-speed content reproduction performed based on variable-speed reproduction streaming data.

SUMMARY OF THE INVENTION

In view of the above-mentioned circumstance, there is provided a content reproduction apparatus for reproducing variable-speed content, the content reproduction apparatus further comprising: a data acquisition section for obtaining first streaming data and second streaming data, wherein the first streaming data includes first reproduction time data indicating a time to reproduce the first streaming data at a first streaming speed, and wherein the second streaming data includes second reproduction time data indicating a time to reproduce the second streaming data at a second streaming speed; and a reproduction time acquisition section for calculating a third reproduction time according to the first reproduction time data, the second reproduction time data, and a relationship between the first streaming speed and the second streaming speed, the third reproduction time being a time to reproduce the first streaming data at the first streaming speed followed by the second streaming data at the first streaming speed.

According to another embodiment of the present invention, there is provided a content reproduction method for reproducing variable-speed content, comprising: obtaining first streaming data, wherein the first streaming data includes first reproduction time data indicating a time to reproduce the first streaming data at a first streaming speed; obtaining second streaming data, wherein the second streaming data includes second reproduction time data indicating a time to reproduce the second streaming data at a second streaming speed; and obtaining a third reproduction time according to the first reproduction time data, the second reproduction time data, and a relationship between the first streaming speed and the second streaming speed, the third reproduction time being a time to reproduce the first streaming data at the first streaming speed followed by the second streaming data at the first streaming speed.

According to still another embodiment of the present invention, there is provided a computer-readable medium comprising instructions which, when executed by a processor, cause the processor to perform a content reproduction method, the method comprising: obtaining first streaming data, wherein the first streaming data includes first reproduction time data indicating a time to reproduce the first streaming data at a first streaming speed; obtaining second streaming data, wherein the second streaming data includes second reproduction time data indicating a time to reproduce the second streaming data at a second streaming speed; and obtaining a third reproduction time according to the first reproduction time data, the second reproduction time data, and a relationship between the first streaming speed and the second streaming speed, the third reproduction time being a time to reproduce the first streaming data at the first streaming speed followed by the second streaming data at the first streaming speed.

BRIEF DESCRIPTION OF THE DRAWINGS

FIG. 12 is a sequence diagram showing a third content reproduction method performed a the content reproduction system.

DESCRIPTION OF THE EMBODIMENTS

Figure 1:
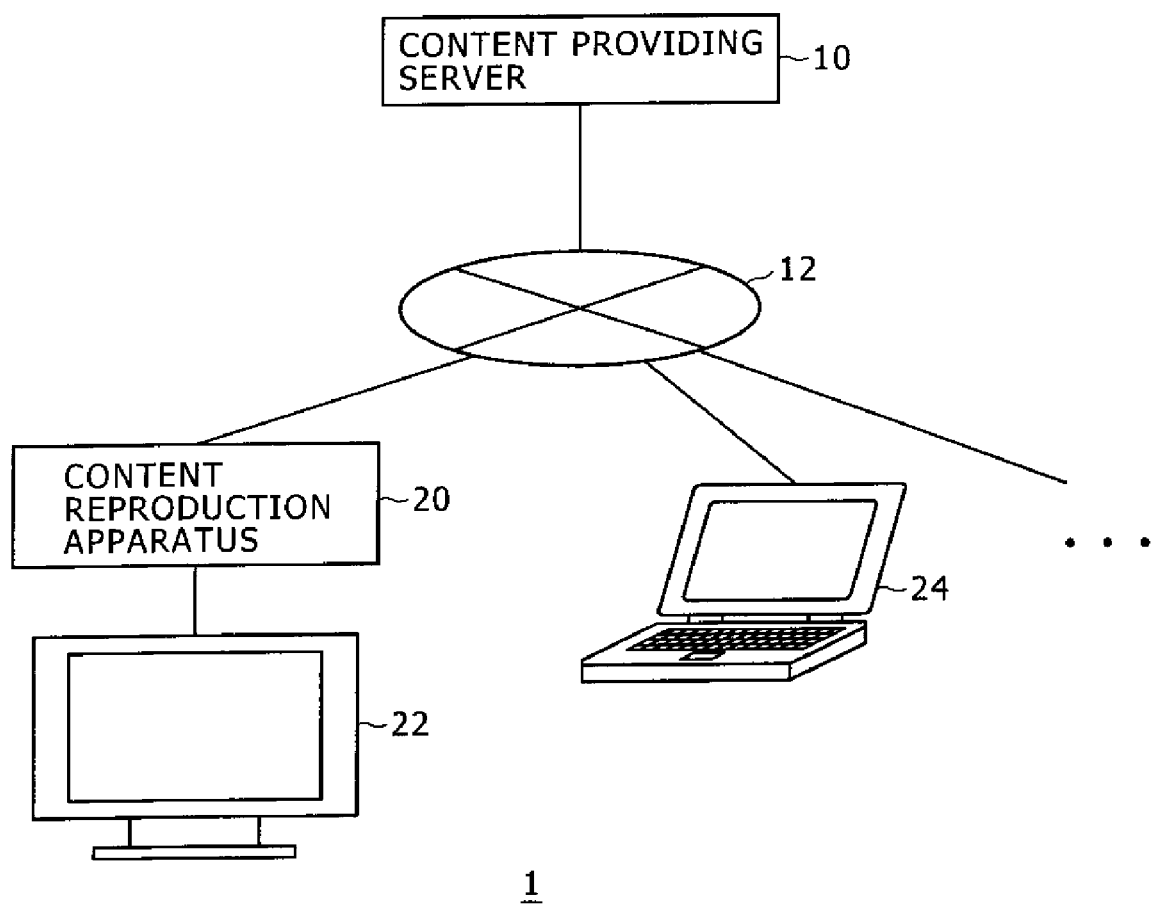
FIG. 1 is an explanatory diagram showing a configuration of a content reproduction system.

In some embodiments, a data acquisition section starts obtaining second streaming data in response to a variable-speed reproduction request, and a reproduction section starts variable-speed reproduction of content based on the second streaming data. A reproduction time acquisition section may calculate a first reproduction time, which may be a reproduction time of the content at a first speed, from time information specified at a reproduction stop data position of the content reproduction performed based on the first streaming data. Further, the reproduction time acquisition section may calculate a second reproduction time, which may be a reproduction time of the content at the second speed, from the difference between time information specified at a start data position of the second streaming data and time information specified at a current data position of the second streaming data. Further, the reproduction time acquisition section may calculate a third reproduction time by adding the time obtained by multiplying the first reproduction time by the first speed to the time obtained by multiplying the second reproduction time by the second speed. The third reproduction time may indicate, for example, a reproduction elapsed time required to reach the current data position if the content is reproduced at the normal speed. In short, in embodiments consistent with the present invention, even if variable-speed reproduction of a content is performed, a reproduction elapsed time of the content can be obtained.

The time information may be time stamp information specified in packets of the first streaming data and the second streaming data. For example, PTS information included in a PES may be used as the time information. However, processing may be complicated if the reproduction time acquisition section obtains the PTS information every time the third reproduction time is obtained. For this reason, for example, time stamp information (TTS) included in a TS packet serving as packet data may be used as the time information, which may simplify processing of the reproduction time acquisition section.

Generally, the second streaming data may include packet data stored in a storage medium. The reproduction time acquisition section may obtain the second reproduction time from the difference between time stamp information specified in packet data that has been supplied to the reproduction section and is about to be used for reproduction, and time stamp information specified in packet data that corresponds to the start data position of the variable-speed reproduction.

The reproduction time acquisition section may further obtain a fourth reproduction time by subtracting a setting time from the third reproduction time. The packet data which constitute the second streaming data recorded in a storage medium may be supplied to the reproduction section and reproduced after decode processing. Therefore, the second reproduction time may be longer than the actual reproduction time. For this reason, the reproduction time acquisition section may obtain, as the fourth reproduction time, a more valid content reproduction elapsed time by subtracting a setting time from the third reproduction time, for example.

A computer program may cause hardware resources of a computer that includes, for example, a CPU and a ROM or RAM to function as the data acquisition section, the recording section, the reproduction section, the reproduction control section, the acquisition control section, and the reproduction time acquisition section. In other words, it is possible for a computer running a program to function as a content reproduction apparatus.

Hereinafter, embodiments of the present invention will be described in detail with reference to the accompanying drawings. Note that, in this specification and the drawings, identical reference numerals are given to components having similar functional configurations, and a description thereof will not be repeated.

The "DETAILED DESCRIPTION OF THE PREFERRED EMBODIMENT" will be described in the following order.

[1] Overview of a content reproduction system according to embodiments consistent with the present invention.

[2] Characteristics of a content reproduction system consistent with embodiments of this invention.

[3] Detailed description of a content reproduction apparatus

[3-1] Hardware configuration of a content reproduction apparatus

[3-2] Functions of a content reproduction apparatus

[3-3] Flow of a first operation of a content reproduction apparatus

[3-4] Flow of a second operation of a content reproduction apparatus

[3-5] Flow of a third operation of a content reproduction apparatus

[4] Conclusion

[1] OVERVIEW OF A CONTENT REPRODUCTION SYSTEM ACCORDING TO EMBODIMENTS CONSISTENT WITH THE PRESENT INVENTION

An overview of a content reproduction system 1 according to this embodiment will be described with reference to FIGS. 1 to 5.

FIG. 1 is an explanatory diagram showing a configuration of the content reproduction system 1 according to embodiments consistent with the present invention. As shown in FIG. 1, the content reproduction system 1 may include a content providing server 10, a content reproduction apparatus 20, a display apparatus 22, and a personal computer (PC) 24.

The content providing server 10 may store streaming data of contents and may serve as a data transmission device which sends streaming data in response to a request from content reproduction apparatus 20 or PC 24, connected to the content providing server 10 via communication network 12. Further, the content providing server 10 may store normal-speed reproduction streaming data for reproducing the content at normal speed. The content providing server 10 may also store variable-speed reproduction streaming data for reproducing the content at a variable speed (for example, a 2× speed, a 10× speed, or a 30× speed).

The "content" here may refer to music data for musical pieces, speeches, and radio programs; video data for movies, television programs, video programs, photographs, documents, paintings, and diagrams; or other types of data for games or software.

The communication network 12 may include a wired cable formed of a copper wire or an optical fiber, a data transmission path for radio waves or the like, and/or a data repeater such as a router or a base station which controls communications. Further, the communication network 12 may be a network based on an Internet protocol.

The content reproduction apparatus 20 may perform various types of processing in cooperation with the content providing server 10 in response to a request from a user. For example, if a content reproduction request is received from the user, the content reproduction apparatus 20 may request that the content providing server 10 send the streaming data of a content, and may obtain the streaming data of the content from the content providing server 10. The content reproduction apparatus 20 may then reproduce the content based on the obtained streaming data. The video and sound of the reproduced content may be output from the display apparatus 22.

FIG. 1 shows a case in which the content reproduction apparatus 20 is configured separately from the display apparatus 22, which may output the reproduced content. However, the content reproduction apparatus 20 and the display apparatus 22 may be integrated like the PC 24, for example.

Although FIG. 1 shows a case in which the content reproduction apparatus 20 and the display apparatus 22 may be integrated like the PC 24, the configuration is not limited to this case. For example, the content reproduction apparatus 20 or the PC 24 may be an information processing apparatus such as a home video processing apparatus (such as a DVD recorder and a video cassette recorder), a cellular phone, a personal handyphone system (PHS) phone, a mobile music reproduction apparatus, a mobile video processing apparatus, a personal digital assistant (PDA), home game equipment, mobile game equipment, and/or a household electric appliance, for example.

Next, a flow of content reproduction in the content reproduction apparatus 20 will be described with reference to FIG. 2.

Figure 2:
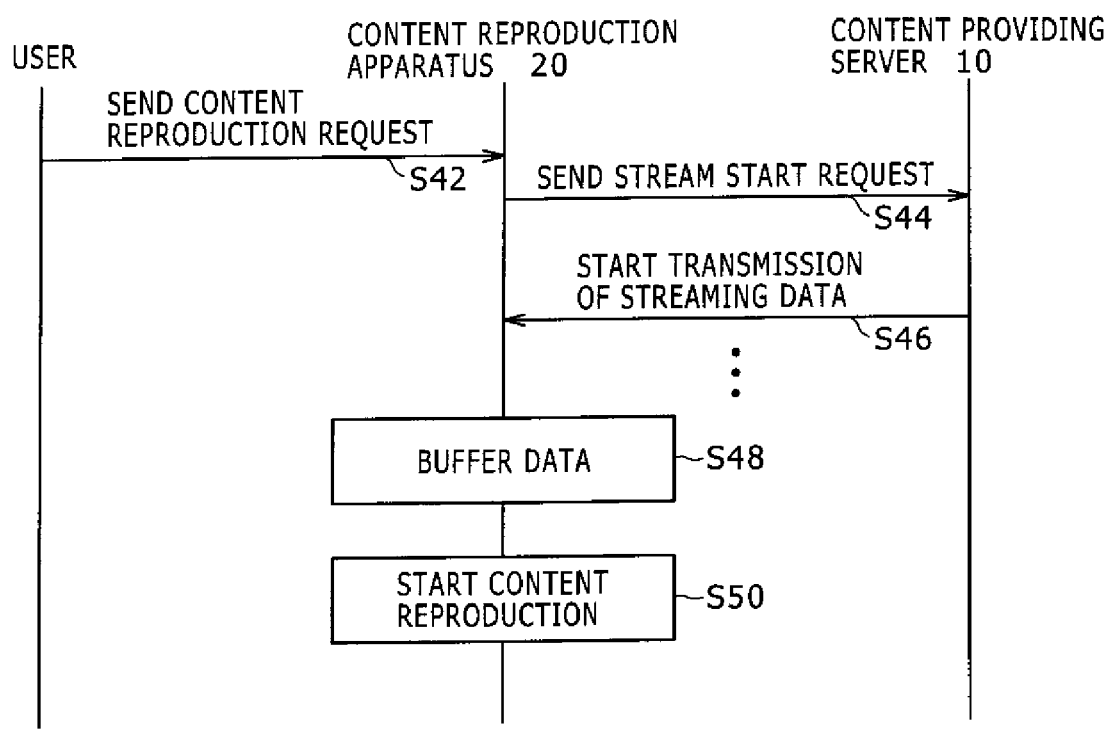
FIG. 2 is a sequence diagram showing a flow of content reproduction.

FIG. 2 is a sequence diagram showing a flow of content reproduction in the content reproduction system 1. If a content reproduction request is received from the user using a remote controller, for example (S42), the content reproduction apparatus 20 may request the content providing server 10 to start transmission of the streaming data of a content (stream start request) (S44).

In response to the stream start request sent from the content reproduction apparatus 20, the content providing server 10 may start to send the streaming data of the content to the content reproduction apparatus 20 (S46). The content reproduction apparatus 20 may buffer the streaming data sent from the content providing server 10 (S48).

If the buffer has a sufficient amount of streaming data to start content reproduction, the content reproduction apparatus 20 may start content reproduction based on the buffered streaming data (S50). In this way, the content reproduction apparatus 20 can reproduce the content while receiving the streaming data without waiting for all pieces of data of the content to be completely received.

Next, a flow in which content reproduction is temporarily stopped and is restarted in the content reproduction apparatus 20 will be described with reference to FIG. 3.

Figure 3:
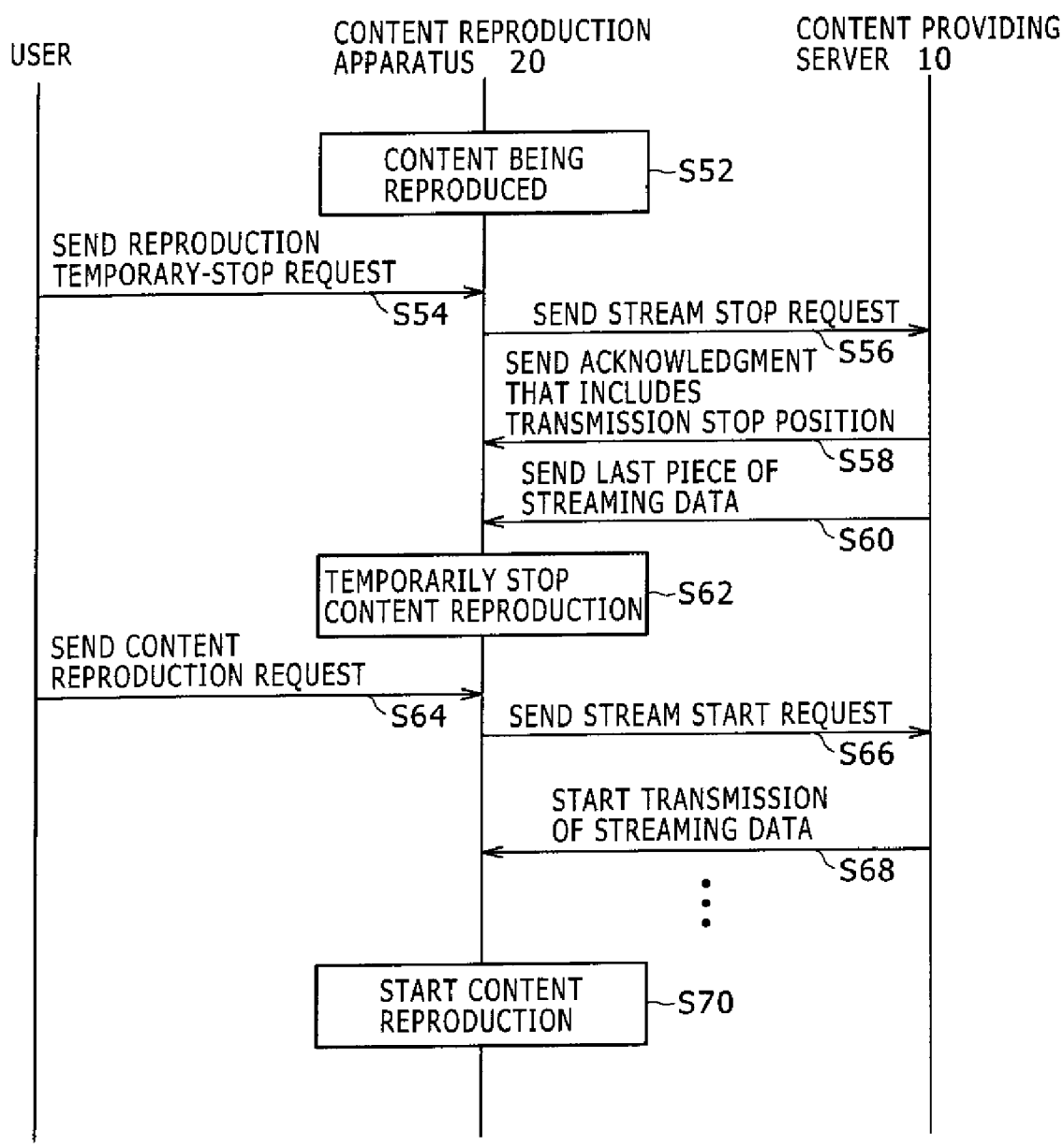
FIG. 3 is a sequence diagram showing a flow in which content reproduction is temporarily stopped and is restarted.

FIG. 3 is a sequence diagram showing a flow in which content reproduction may be temporarily stopped and restarted in the content reproduction system 1. In a state in which the content reproduction apparatus 20 is reproducing a content while receiving the streaming data from the content providing server 10 (S52), the user may request the content reproduction apparatus 20 to temporarily stop the content reproduction (S54).

If the request to temporarily stop the content reproduction is received, the content reproduction apparatus 20 may request the content providing server 10 to stop sending the streaming data (stream stop request) (S56). The content providing server 10 may send an acknowledgement indicating that the stream stop request has been received from the content reproduction apparatus 20, to the content reproduction apparatus 20 (S58). The last piece of streaming data sent from the content providing server 10 may arrive at the content reproduction apparatus 20 (S60).

If the last piece of streaming data is received, the content reproduction apparatus 20 may temporarily stop the content reproduction (S62). Thereafter, if a content reproduction request is received from the user (S64), the content reproduction apparatus 20 may request the content providing server 10 to start transmission of the streaming data of the content (stream start request) (S66).

In response to the stream start request from the content reproduction apparatus 20, the content providing server 10 may start to send the streaming data of the content to the content reproduction apparatus 20 (S68). The content reproduction apparatus 20 may buffer the streaming data sent from the content providing server 10.

If the buffered streaming data has a sufficient amount to start content reproduction, the content reproduction apparatus 20 may start the content reproduction based on the buffered streaming data (S70). In this way, the content reproduction apparatus 20 can stop receiving the streaming data in response to the request to temporarily stop the reproduction from the user, and restart receiving the streaming data in response to the reproduction request.

Figure 4:
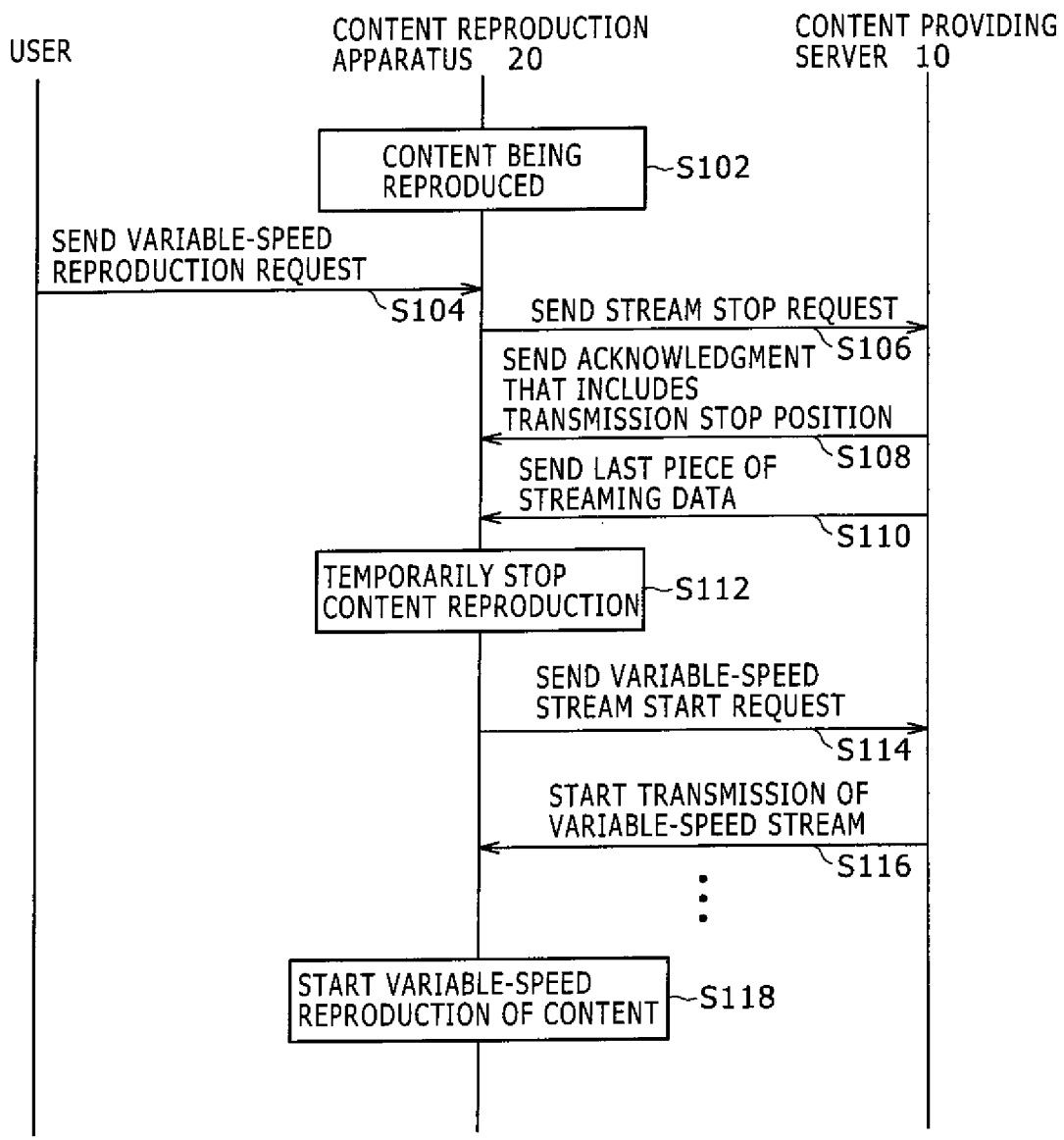
FIG. 4 is an explanatory diagram showing an example of a variable-speed reproduction operation.

FIG. 4 is an explanatory diagram showing an example of a variable-speed reproduction operation of the content reproduction apparatus 20. In a state where the content reproduction apparatus 20 is reproducing a content while receiving the normal-speed reproduction streaming data from the content providing server 10 (S102), the user may request the content reproduction apparatus 20 to perform variable-speed reproduction of the content (S104).

If the variable-speed reproduction is requested, the content reproduction apparatus 20 may request the content providing server 10 to stop sending the normal-speed reproduction streaming data (stream stop request) (S106). The content providing server 10 may send an acknowledgement indicating that the stream stop request has been received from the content reproduction apparatus 20, to the content reproduction apparatus 20 (S108). The last piece of the normal-speed reproduction streaming data sent from the content providing server 10 may arrive at the content reproduction apparatus 20 (S110).

If the last piece of the normal-speed reproduction streaming data is received, the content reproduction apparatus 20 may temporarily stop the normal-speed content reproduction (S112). Then, the content reproduction apparatus 20 may request the content providing server 10 to start transmission of variable-speed reproduction streaming data of the content (stream start request) (S114).

In some embodiments, in response to the stream start request from the content reproduction apparatus 20, the content providing server 10 may start sending the variable-speed reproduction streaming data of the content, to the content reproduction apparatus 20 (S116). The content reproduction apparatus 20 may buffer the variable-speed reproduction streaming data sent from the content providing server 10.

If the buffered variable-speed reproduction streaming data has a sufficient amount to start variable-speed content reproduction, the content reproduction apparatus 20 may start variable-speed reproduction of the content based on the buffered variable-speed reproduction streaming data (S118).

As described above, in embodiments consistent with the present invention, the content reproduction apparatus 20 can reproduce the content at a variable speed based on the variable-speed reproduction streaming data, in response to the variable-speed reproduction request from the user.

Figure 5:
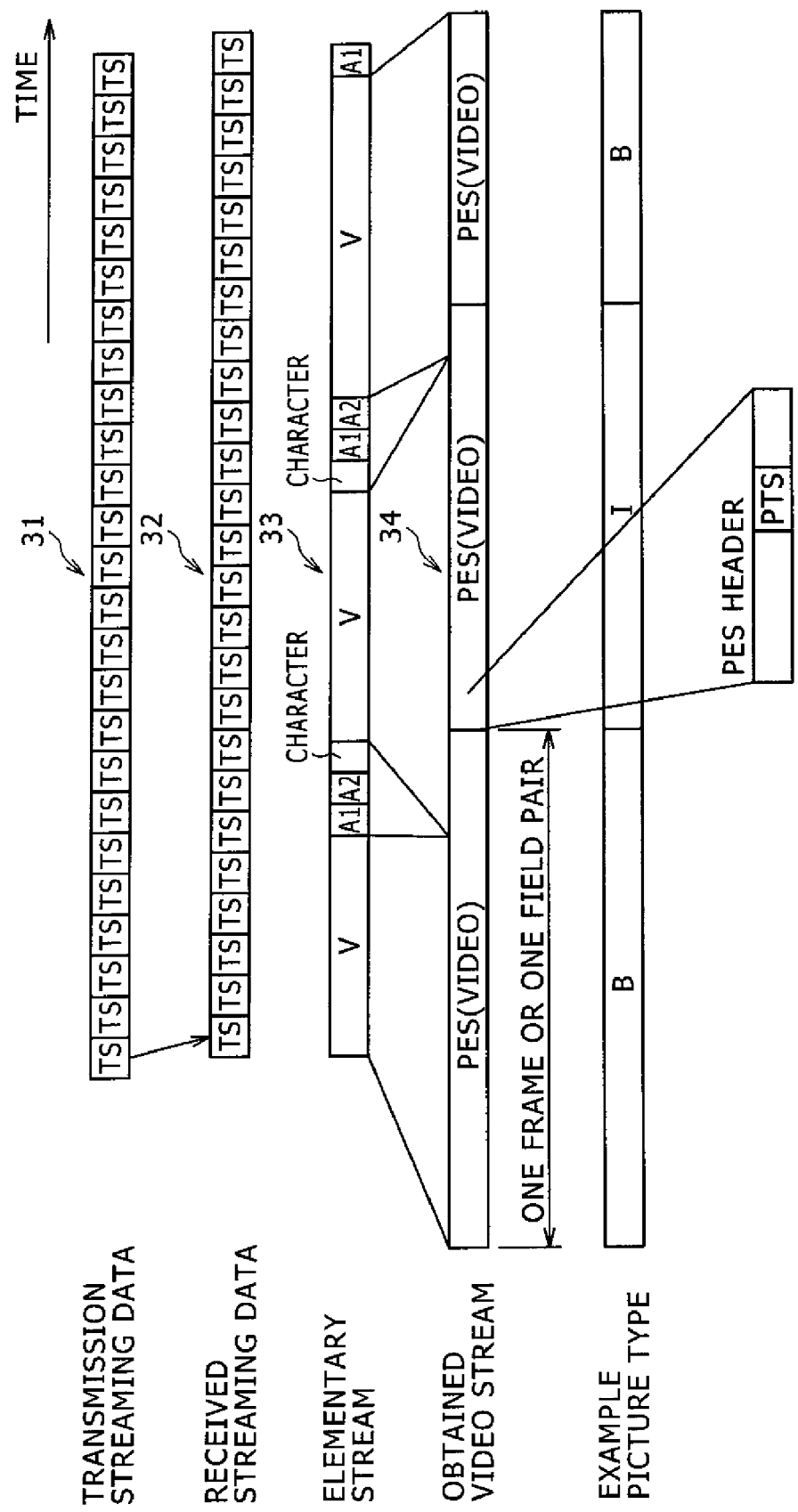
FIG. 5 is an explanatory diagram showing the relationship between streaming data and PES.

Referring to FIG. 5, streaming data and a packetized elementary stream (PES) obtained from the streaming data will be described.

FIG. 5 is an explanatory diagram showing the relationship between the streaming data and the PES. A first row of FIG. 5 shows transmission streaming data 31, which may be sent by the content providing server 10. A second row of FIG. 5 shows reception streaming data 32, which may be received by the content reproduction apparatus 20 from the content providing server 10.

The streaming data of a content, such as the transmission streaming data 31 and the reception streaming data 32, may include a plurality of TS packets (transport packets) as shown in FIG. 5.

The TS packets may include multiple medium classes of data such as video data, sound data, and subtitle data. In each TS packet, the time stamp (TTS), which may indicate the timing at which the TS packet is sent by the content providing server 10, may be specified. For example, TTS may be a count value counted at a frequency of 27 MHz. Further, TTS may be set to a value corresponding to the transmission timing if the content providing server 10 sends the streaming data, and added to a TS packet. Alternatively, TTS may be added to a TS packet in advance.

Since the content reproduction time can be specified based on TTS, TTS may serve as time information. Further, since the order of TS packets can be estimated by referring to TTS, TTS may also serve as order information.

There may be a delay from the time the content providing server 10 sends the transmission streaming data 31 to the time the content reproduction apparatus 20 receives the reception streaming data 32. For this reason, in FIG. 5, the transmission streaming data 31 and the reception streaming data 32 are indicated with a shift along the time axis.

A third row of FIG. 5 shows an elementary (E) stream 33, which may be obtained from the TS packets, which may constitute the streaming data. A fourth row of FIG. 5 shows packetized elementary streams (PESs) 34, which may be obtained by dividing the E stream 33 to have variable length blocks, and attaching header information to the variable length blocks.

Header information added to each PES may be called a PES header. The PES header may include presentation time stamp (PTS) information. The PTS information may serve as time information indicating the timing of displaying the PES that includes the PTS information, starting from a predetermined point of time.

A fifth row of FIG. 5 shows example picture types of the PESs. For example, the types of the PESs may be a B picture, an I picture, and a P picture.

[2] CHARACTERISTICS OF A CONTENT REPRODUCTION SYSTEM CONSISTENT WITH EMBODIMENTS OF THIS INVENTION

The overview of the content reproduction system 1 according to embodiments consistent with the present invention has been described above. Hereinafter, characteristics of embodiments consistent with the present invention will be described by taking, as a comparative example, a content reproduction apparatus 20'.

Figure 6:
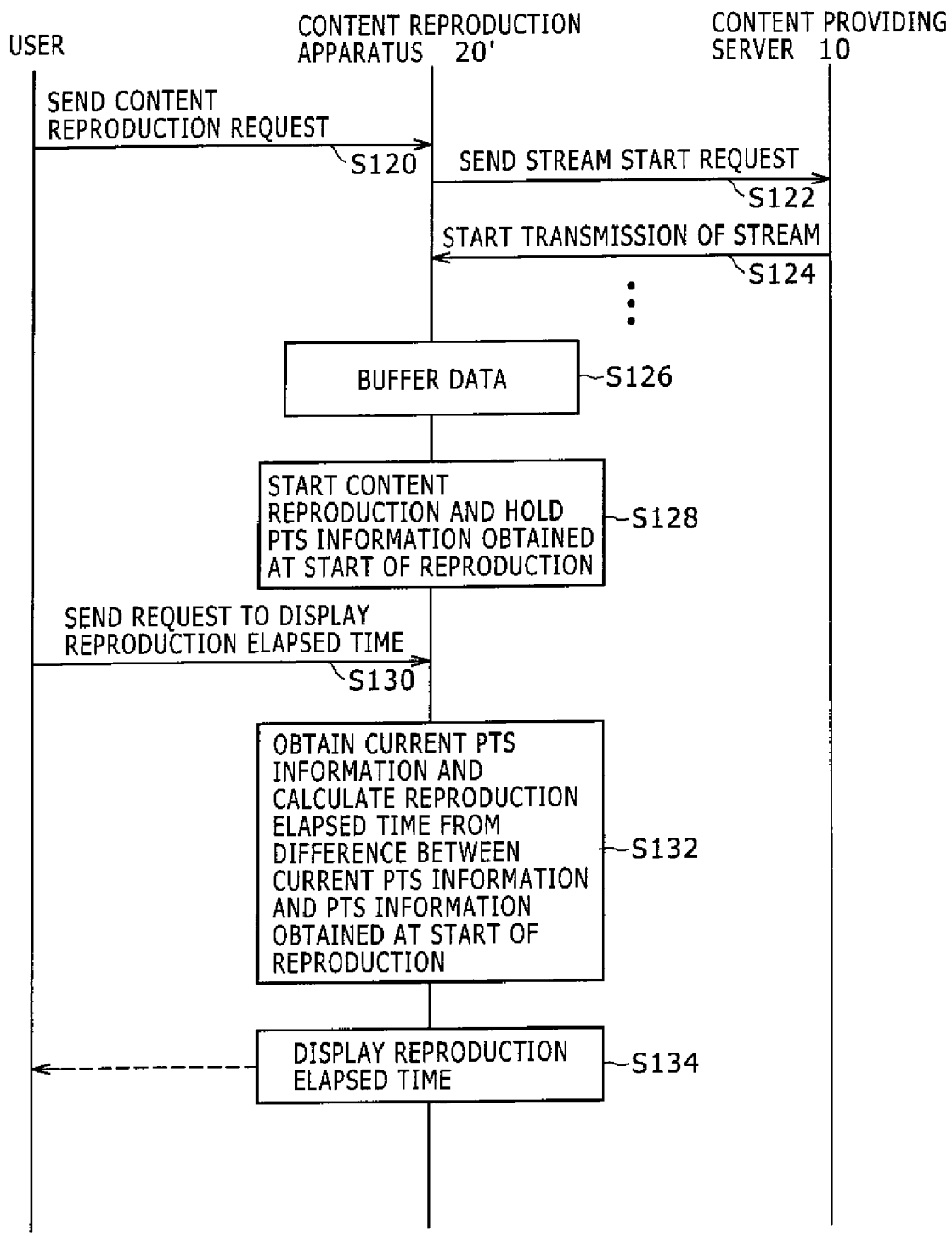
FIG. 6 is a sequence diagram showing an example operation of a comparative-example content reproduction apparatus.

FIG. 6 is a sequence diagram showing an example operation of the content reproduction apparatus 20'. If a content reproduction request is received from the user (S120), the content reproduction apparatus 20' may request the content providing server 10 to start transmission of the streaming data of a content (S122).

In response to the request sent from the content reproduction apparatus 20', the content providing server 10 may start sending the streaming data to the content reproduction apparatus 20' (S124). The content reproduction apparatus 20' may buffer the streaming data sent from the content providing server 10 (S126). Then, the content reproduction apparatus 20' may start content reproduction based on the buffered streaming data and may hold PTS information included in the PES obtained at the start of the reproduction (S128).

If a request to display the reproduction elapsed time is received from the user (S130), the content reproduction apparatus 20' may obtain PTS information included in the currently-reproduced PES and may calculate the reproduction elapsed time by obtaining the difference between this PTS information and the PTS information included in the PES obtained at the start of the reproduction (S132). The content reproduction apparatus 20' may display the calculated reproduction elapsed time (S134), and the user can understand the content reproduction elapsed time.

However, the method of displaying the reproduction elapsed time in the content reproduction apparatus 20' is based on the assumption that a content is reproduced from its normal-speed reproduction streaming data. Therefore, if normal-speed content reproduction performed based on normal-speed reproduction streaming data is switched to variable-speed content reproduction performed based on variable-speed reproduction streaming data, it may be difficult for the content reproduction apparatus 20' to calculate a valid content reproduction time.

At least partially in view of the above-described circumstance, the content reproduction apparatus 20 according to embodiments consistent with the present invention is disclosed. In some embodiments, according to the content reproduction apparatus 20, a valid content reproduction time can be obtained if streaming data used for reproduction is switched. Hereinafter, the content reproduction apparatus 20 will be described in detail with reference to FIGS. 7 to 12.

[3] DETAILED DESCRIPTION OF THE CONTENT REPRODUCTION APPARATUS

[3-1] Hardware Configuration of the Content Reproduction Apparatus

Figure 7:
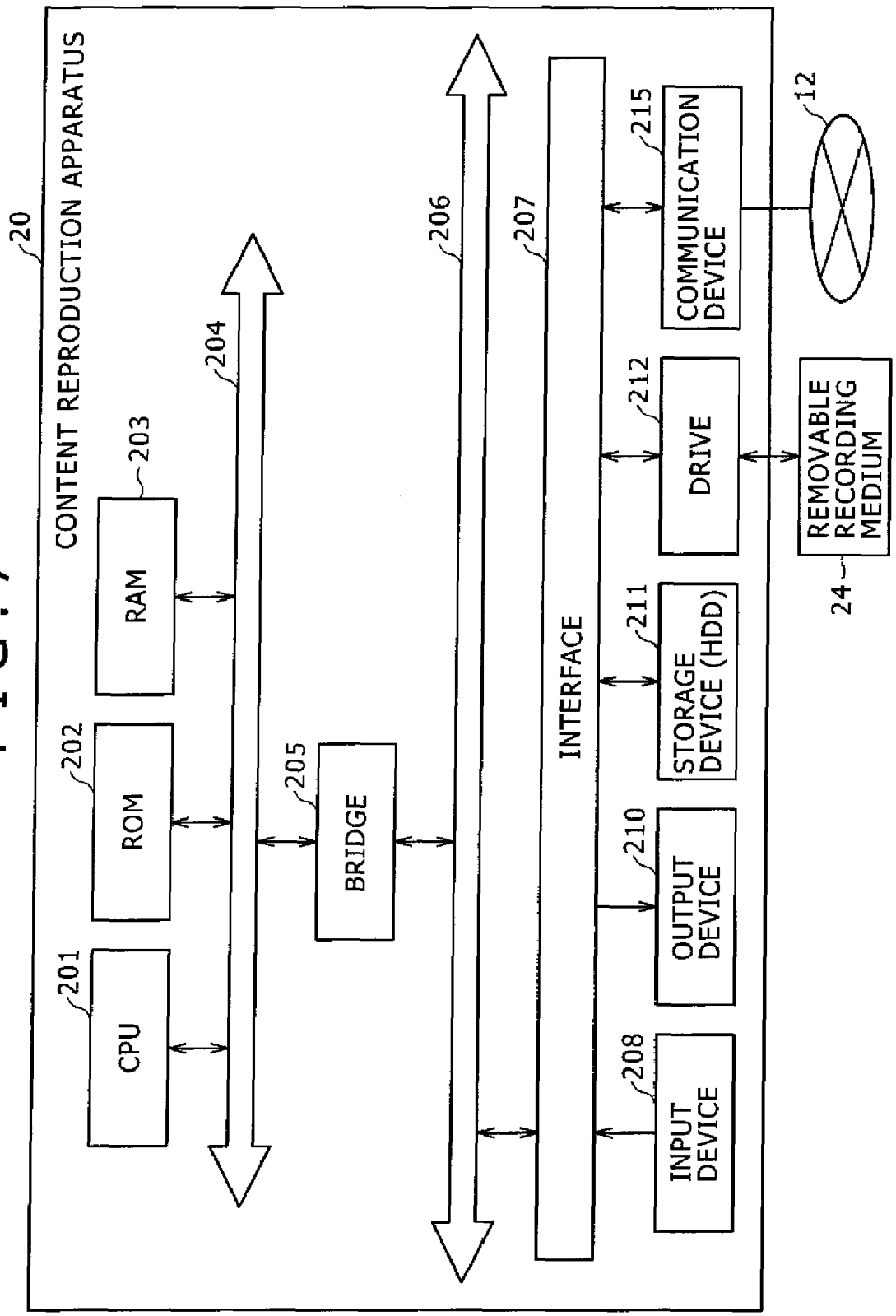
FIG. 7 is an explanatory diagram showing a hardware configuration of a content reproduction apparatus.

FIG. 7 is an explanatory diagram showing a hardware configuration of the content reproduction apparatus 20 according to some embodiments. The content reproduction apparatus 20 may include a central processing unit (CPU) 201, a read only memory (ROM) 202, a random access memory (RAM) 203, a host bus 204, a bridge 205, an external bus 206, an interface 207, an input device 208, an output device 210, a storage device (HDD) 211, a drive 212, and a communication device 215.

The CPU 201 may function as a calculation processing unit and a control unit, and may control all (or some) operations performed in the content reproduction apparatus 20 according to various programs. The CPU 201 may be a microprocessor. The ROM 202 may store programs and calculation parameters used by the CPU 201. The RAM 203 may temporarily store a program used and executed by the CPU 201 and parameters changed, if necessary, during the execution. The CPU 201, the ROM 202, and the RAM 203 may be connected to one another via the host bus 204 formed of a CPU bus or the like.

The host bus 204 may be connected to the external bus 206, such as a peripheral component interconnect/interface (PCI) bus, via the bridge 205. Note that it is not necessary to separately configure the host bus 204, the bridge 205, and the external bus 206 and that their functions may be implemented in one bus.

The input device 208 may include an input unit used by the user to input information, such as a mouse, a keyboard, a touch panel, buttons, a microphone, switches, a lever, or a remote controller; and/or an input control circuit which may generate an input signal in response to an input of the user and outputs it to the CPU 201. The user of the content reproduction apparatus 20 can input various types of data to the content reproduction apparatus 20 and instruct the content reproduction apparatus 20 to perform an operation, by operating the input device 208.

The output device 210 may include a display unit, such as a cathode ray tube (CRT) display unit, a liquid crystal display (LCD) unit, an organic light emitting display (OLED) unit, or a lamp; and a sound output unit, such as a speaker or headphones, for example. The output device 210 may output reproduced content, for example. Specifically, the display unit may display various types of information of reproduced video data in the form of text or images. On the other hand, the sound output unit may convert reproduced sound data to sound and outputs the sound.

The storage device 211 may be a data storage device configured as a part of a storage section of the content reproduction apparatus 20, and may include a storage medium, a recording unit for recording data in the storage medium, a reading unit for reading the data from the storage medium, and a deleting unit for deleting the data from the storage medium. The storage device 211 may be formed of a hard disk drive (HDD), for example. The storage device 211 may drive a hard disk to store the programs executed by the CPU 201 and various types of data. Further, the storage device 211 may store streaming data.

The drive 212 may be a storage-medium reader/writer, and may be included in or attached to the content reproduction apparatus 20. The drive 212 may read information recorded in an inserted removable storage medium 24 such as a magnetic disk, an optical disk, a magneto optical disk, and/or a semiconductor memory, and may output the information to the RAM 203.

The communication device 215 may be a communication interface formed, for example, of a communication unit used to connect to the communication network 12. The communication device 215 may handle a wireless local area network (LAN), a wireless USB, and/or wired communication. The communication device 215 may send various requests to and receive streaming data from the content providing server 10 via the communication network 12.

Because the content providing server 10 may have a similar hardware configuration as the content reproduction apparatus 20, a description of the content providing server 10 is omitted.

[3-2] Functions of the Content Reproduction Apparatus

The hardware configuration of the content reproduction apparatus 20 has been described above with reference to FIG. 7. Next, functions of the content reproduction apparatus 20 will be described with reference to FIGS. 8 and 9.

Figure 8:
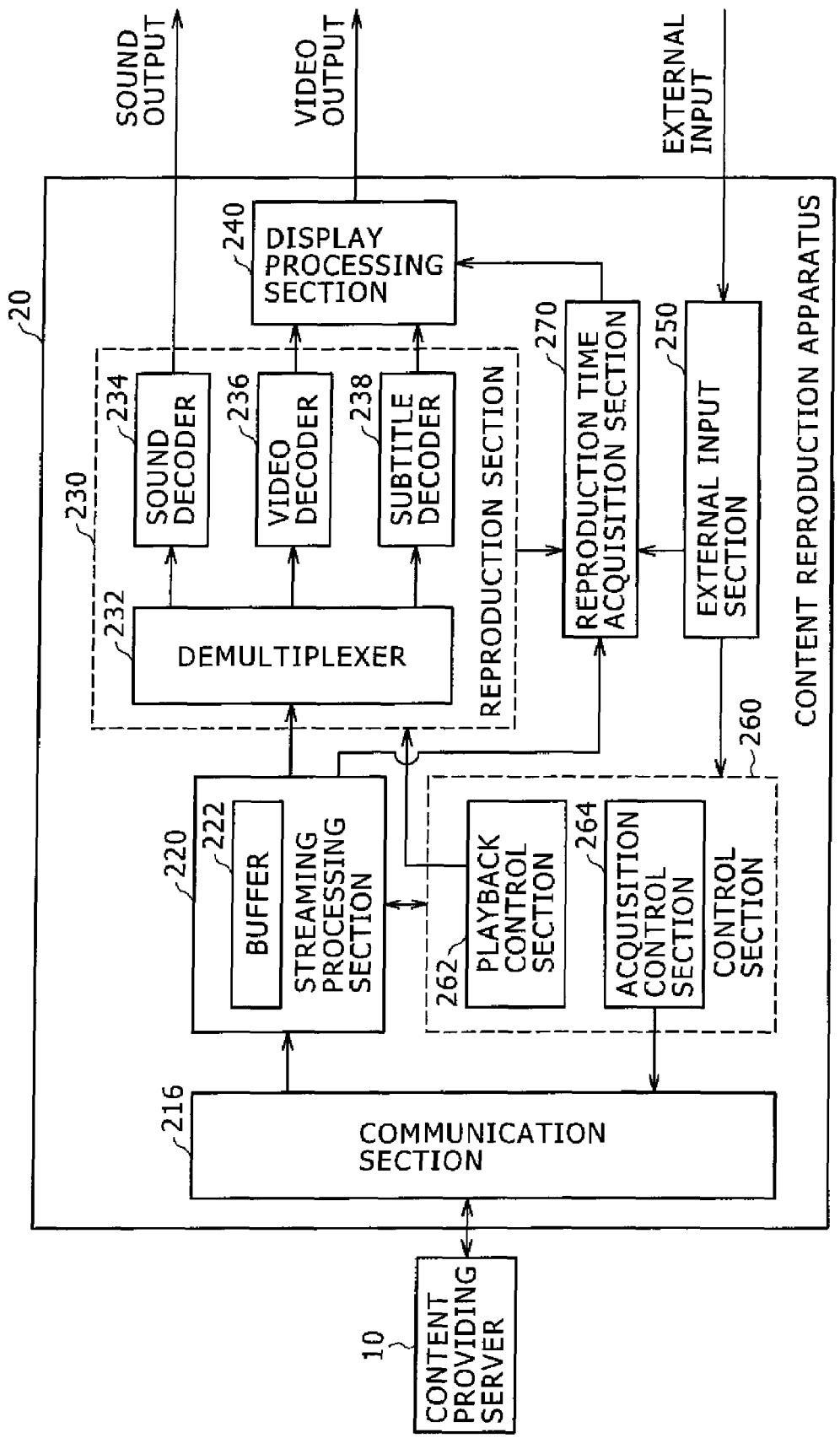
FIG. 8 is a function block diagram showing a configuration of a content reproduction apparatus.

FIG. 8 is a function block diagram showing a configuration of the content reproduction apparatus 20. As shown in FIG. 8, the content reproduction apparatus 20 may include a communication section 216, a streaming processing section 220, a reproduction section 230, a display processing section 240, an external input section 250, a control section 260, and/or a reproduction time acquisition section 270.

The communication section 216 may be an interface to the content providing server 10 and may operate under the control of an acquisition control part 264 of the control section 260. For example, the communication section 216 may function as a data acquisition section which may request the content providing server 10 to send streaming data and may obtain the streaming data from the content providing server 10 under the control of the acquisition control part 264.

Further, the communication section 216 may perform communication processing by a hypertext transfer protocol (HTTP), a real-time transport protocol (RTP), a transmission control protocol (TCP), a user datagram protocol (UDP), and/or an IP.

The streaming processing section 220 may have a function of a recording section which may buffer (records) streaming data received by the communication section 216, in a buffer 222, which may serve as a storage medium. The streaming processing section 220 may also have a function of a supply processing section which may supply the streaming data buffered in the buffer 222 to the reproduction section 230 at appropriate timing.

For example, if the streaming data buffered in the buffer 222 has a data amount that does not cause buffer overflow nor buffer underflow, the streaming processing section 220 may start to supply the streaming data to the reproduction section 230. The data amount that does not cause buffer overflow nor buffer underflow may be a data amount that corresponds to half of the storage capacity of the buffer 222, or any other data amount. Further, the streaming processing section 220 may apply packet error correction of the streaming data received by the communication section 216.

The reproduction section 230 may include a demultiplexer 232, a sound decoder 234, a video decoder 236, and/or a subtitle decoder 238.

The demultiplexer 232 may determine whether each of TS packets constituting the streaming data supplied from the streaming processing section 220 corresponds to the sound, the video, or the subtitle. Then, the demultiplexer 232 may output a TS packet that corresponds to the sound to the sound decoder 234 as a sound E stream, may output a TS packet that corresponds to the video to the video decoder 236 as a video E stream, and may output a TS packet that corresponds to the subtitle to the subtitle decoder 238 as a subtitle E stream.

The sound decoder 234 may decode the sound E stream received from the demultiplexer 232 to generate a sound signal. The sound E stream may be encoded in an audio compression format such as MPEG1 layer-3 (MP3), advanced audio codec (AAC), linear PCM (LPCM), Windows (registered trademark) media audio 9 (WMA9), adaptive transform acoustic coding (ATRAC), and/or ATRAC3.

The video decoder 236 may decode the video E stream received from the demultiplexer 232 to generate a video signal. The video E stream may be encoded in an image compression format such as moving picture experts group (MPEG) 1, MPEG 2, and/or MPEG 4. The subtitle decoder 238 may decode the subtitle E stream received from the demultiplexer 232 to generate a subtitle signal.

The reproduction section 230 may apply processing substantially the same as that for normal-speed reproduction streaming data, to variable-speed reproduction streaming data corresponding to an n× speed to realize content reproduction at the n× speed.

The display processing section 240 may superimpose the subtitle signal generated by the subtitle decoder 238 on the video signal generated by the video decoder 236 and may output them.

The external input section 250 may be a user interface such that various requests and instructions may be input to the content reproduction apparatus 20 from the outside (user). For example, the external input section 250 may receive a signal sent from the remote controller according to a user operation. The external input section 250 may output the signal, which may indicate a request or an instruction for the control section 260, to the control section 260. Examples of the above-mentioned various requests include a content reproduction request, a temporary-stop request, a fast-forward request, a fast-rewind request, a variable-speed reproduction request, and a reverse-direction reproduction request, among others.

The control section 260 may include a reproduction control part 262 and the acquisition control part 264.

The reproduction control part 262 may control the streaming processing section 220 and the reproduction section 230 according to a signal received from the external input section 250. For example, if a request to temporarily stop the content reproduction is received from the external input section 250, the reproduction control part 262 may stop, at predetermined timing, the streaming processing section 220 supplying the streaming data to the reproduction section 230.

The acquisition control part 264 may control the communication section 216 according to a signal received from the external input section 250. For example, if a content reproduction request is received from the external input section 250, the acquisition control part 264 may cause the communication section 216 to request the content providing server 10 to send streaming data. If a request to temporarily stop the content reproduction is received from the external input section 250, the acquisition control part 264 may cause the communication section 216 to request the content providing server 10 to stop sending the streaming data.

Further, if variable-speed reproduction is requested by the user, the acquisition control part 264 may cause the communication section 216 to request the content providing server 10 to send variable-speed reproduction streaming data corresponding to the speed specified by the user. If responding to this request, the content providing server 10 may send variable-speed reproduction streaming data corresponding to the specified speed or a speed close to the specified speed. For example, if the communication section 216 requests the content providing server 10 to send variable-speed reproduction streaming data corresponding to an 8× speed, the content providing server 10 may send variable-speed reproduction streaming data corresponding to the 8× speed or a 10× speed, or at another similar speed.

The reproduction time acquisition section 270 may obtain a content reproduction elapsed time in response to a reproduction elapsed time display request from the user. Further, the reproduction time acquisition section 270 may output the obtained reproduction elapsed time to the display processing section 240. The display processing section 240 may display the reproduction elapsed time.

Specifically, while a content is being reproduced at the normal speed based on the normal-speed reproduction streaming data, the reproduction time acquisition section 270 can obtain the reproduction elapsed time based on PTS information included in the PES that is currently reproduced. A reproduction elapsed time acquisition method of the reproduction time acquisition section 270 in the normal-speed reproduction may be similar to that of the content reproduction apparatus 20', described with reference to FIG. 6, and a description thereof is omitted.

The reproduction elapsed time may be the time required to reach the current reproduction position of the content if the content is reproduced at the normal speed (1× speed).

Further, the reproduction time acquisition section 270 of this embodiment can obtain a valid reproduction elapsed time even while variable-speed content reproduction is being performed based on variable-speed reproduction streaming data.

As described above, the PTS information may indicate timing if the PES that includes the PTS information is displayed, starting from a predetermined point of time. For example, a current PES may include PTS information having a difference of 30 minutes from the PTS information included in the PES used at the start of reproduction. Accordingly, the current PES may be displayed if 30 minutes pass from the start of the reproduction. Therefore, if content is reproduced at the normal speed based on the normal-speed reproduction streaming data, the reproduction elapsed time can be easily obtained by just using the difference in PTS information included in the PES used at the start of the reproduction and in the current PES.

Further, if content is reproduced at the 3× speed, a current PES may include PTS information having a difference of 30 minutes from the PTS information included in the PES used at the start of the reproduction. Accordingly, the current PES may be reproduced if 30 minutes pass from the start of the reproduction. Therefore, if variable-speed reproduction is performed, it may be difficult to obtain the reproduction elapsed time just based on PTS information included in the PES used at the start of the reproduction and in the current PES.

If variable-speed reproduction is performed, the reproduction time acquisition section 270 of this embodiment can obtain a reproduction time (second reproduction time) for which variable-speed reproduction has been performed, by multiplying the difference in PTS information included in the PES used at the start of the reproduction and in the PES currently reproduced, by the speed of the variable-speed reproduction.

For example, a content may be reproduced at the 3× speed, and a PES may include PTS information having a difference of 30 minutes from the PTS information included in the PES used at the start of the reproduction. In this example, the reproduction time acquisition section 270 obtains 90 minutes as the reproduction elapsed time.

Further, the reproduction time acquisition section 270 of this embodiment can obtain a valid reproduction elapsed time even if normal-speed content reproduction is switched to variable-speed content reproduction Specifically, the reproduction time acquisition section 270 can obtain a reproduction elapsed time (third reproduction time) by adding a normal-speed reproduction time (first reproduction time) to the time obtained by multiplying a variable-speed reproduction time (second reproduction time) by the speed of the variable-speed reproduction. Details of the processing will be described later with reference to FIGS. 10 and 11.

A method of obtaining a reproduction elapsed time based on PTS information has been described above, and the PTS information is just taken as an example of time information. There are many different ways to acquire time information. For example, the reproduction time acquisition section 270 may obtain a reproduction elapsed time based on TTS added to a TS packet, shown in FIG. 9.

Figure 9:
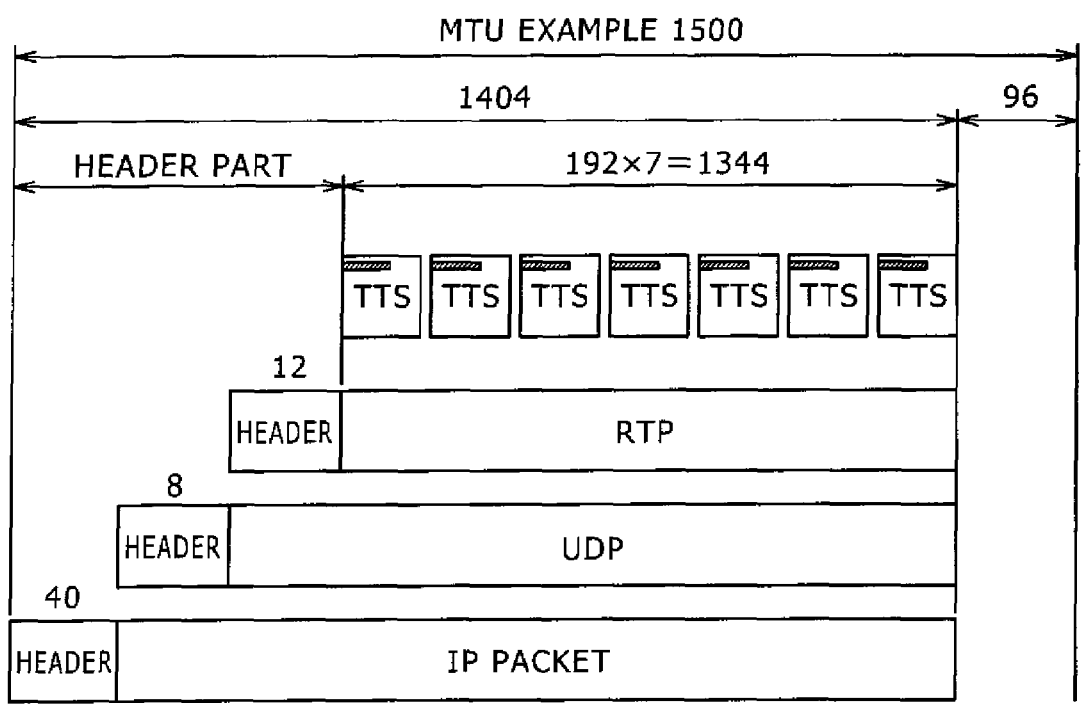
FIG. 9 is an explanatory diagram showing an example MTU configuration of streaming data sent from a content providing server.

FIG. 9 is an explanatory diagram showing an example MTU configuration of streaming data sent from the content providing server 10. As shown in FIG. 9, a maximum transmission unit (MTU) is a transmission unit of streaming data that may be sent from the content providing server 10, and may include a plurality of TS packets, an RTP header, a UDP header, and/or an IP packet header.

TTS (time stamp information) expressed by four bytes may be specified at the top of each of the TS packets. As described above, TTS may indicate timing if a TS packet including the TTS is sent by the content providing server 10. For example, ITS may be a count value counted at a frequency of 27 MHz. Further, TTS may be added to a TS packet if the content providing server 10 sends the streaming data. Alternatively, TTS may be added to a TS packet in advance.

The reproduction time acquisition section 270 can also obtain the time required to reproduce two TS packets, by dividing the difference in TTS included in the two TS packets by the clock frequency.

[3-3] Flow of a First Operation of the Content Reproduction Apparatus

The function configuration of the content reproduction apparatus 20, consistent with embodiments of the present invention, has been described above. Next, a first content reproduction method performed in the content reproduction system 1 will be described with reference to FIG. 10.

Figure 10:
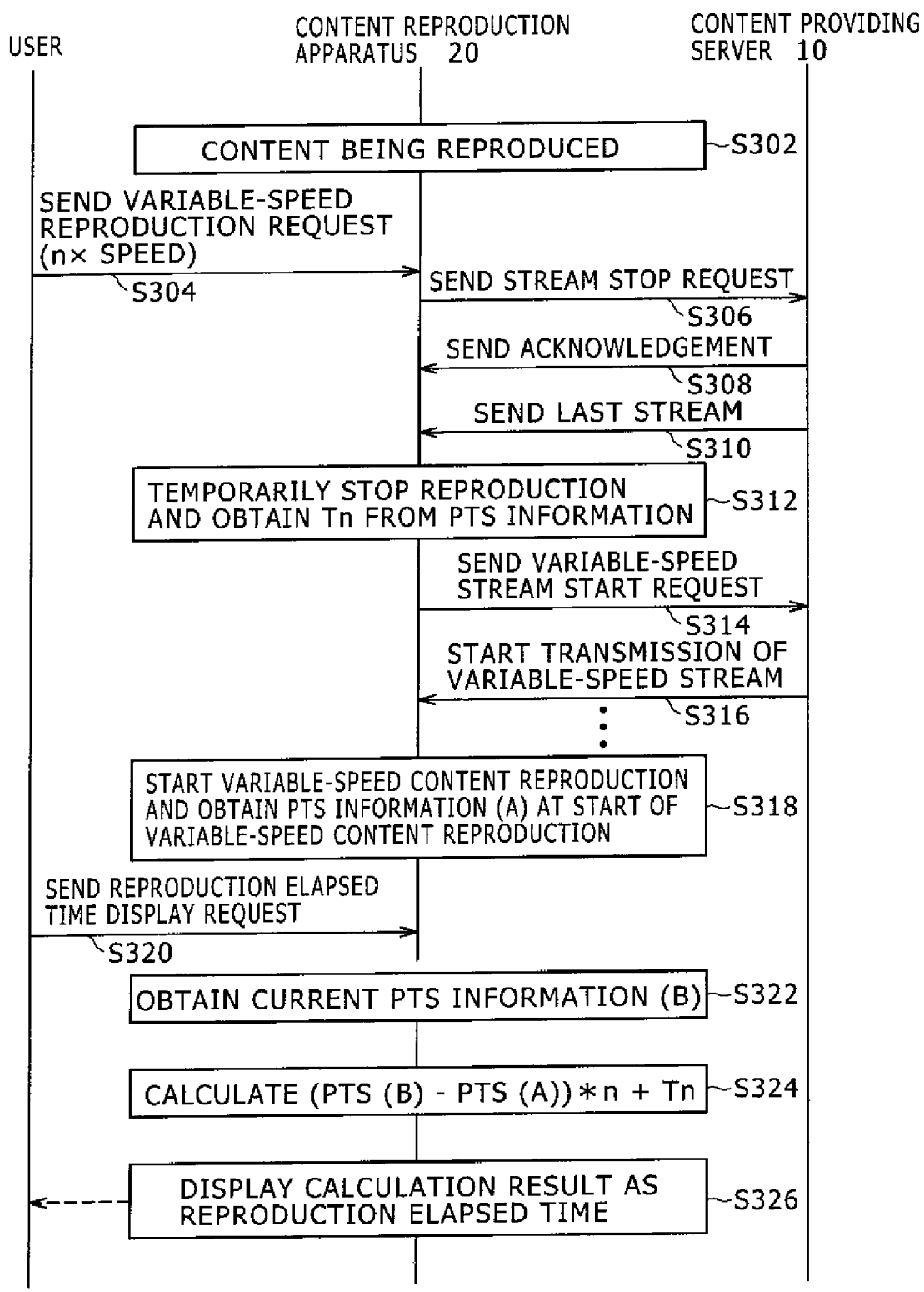
FIG. 10 is a sequence diagram showing a first content reproduction method performed in a content reproduction system.

FIG. 10 is a sequence diagram showing a first content reproduction method performed in the content reproduction system 1 in some embodiments. The content reproduction apparatus 20 may reproduce a content at the normal speed while receiving the normal-speed reproduction streaming data from the content providing server 10 (S302). Then, if an n×-speed reproduction request is input by the user (S304), the content reproduction apparatus 20 may request the content providing server 10 to stop sending the normal-speed reproduction streaming data (S306).

The content providing server 10 may send an acknowledgement of the request from the content reproduction apparatus 20, to the content reproduction apparatus 20 (S308). Then, the content reproduction apparatus 20 may receive the last piece of the normal-speed reproduction streaming data sent from the content providing server 10 (S310). The content reproduction apparatus 20 may temporarily stop the content reproduction. The reproduction time acquisition section 270 may obtain the normal-speed content reproduction time Tn based on the difference between the PTS information included in a PES used if the reproduction is temporarily stopped and the PTS information included in the PES used at the start of the reproduction (S312). The reproduction time acquisition section 270 may obtain a PES and PTS information from the reproduction section 230, for example.

Then, the content reproduction apparatus 20 may request the content providing server 10 to start to send variable-speed reproduction streaming data corresponding to the n× speed (S314). If responding to the request from the content reproduction apparatus 20, the content providing server 10 may start to send variable-speed reproduction streaming data corresponding to the n× speed (S316).

The content reproduction apparatus 20 may start to reproduce the content at the n× speed based on the variable-speed reproduction streaming data corresponding to the n× speed. The reproduction time acquisition section 270 may obtain PTS information (A) included in the PES used at the start of the variable-speed reproduction (S318).

If a reproduction elapsed time display request is input from the user (S320), the reproduction time acquisition section 270 may obtain PTS information (B) included in the PES currently reproduced (S322). The reproduction time acquisition section 270 may calculate the reproduction elapsed time according to an expression $((PTS(B)-PTS(A))*n+Tn)$ (S324). The content reproduction apparatus 20 may then display the reproduction elapsed time (S326) and the user can understand the content reproduction elapsed time.

[3-4] Flow of a Second Operation of the Content Reproduction Apparatus

A second content reproduction method performed in the content reproduction system 1 will be described with reference to FIG. 11.

Figure 11:
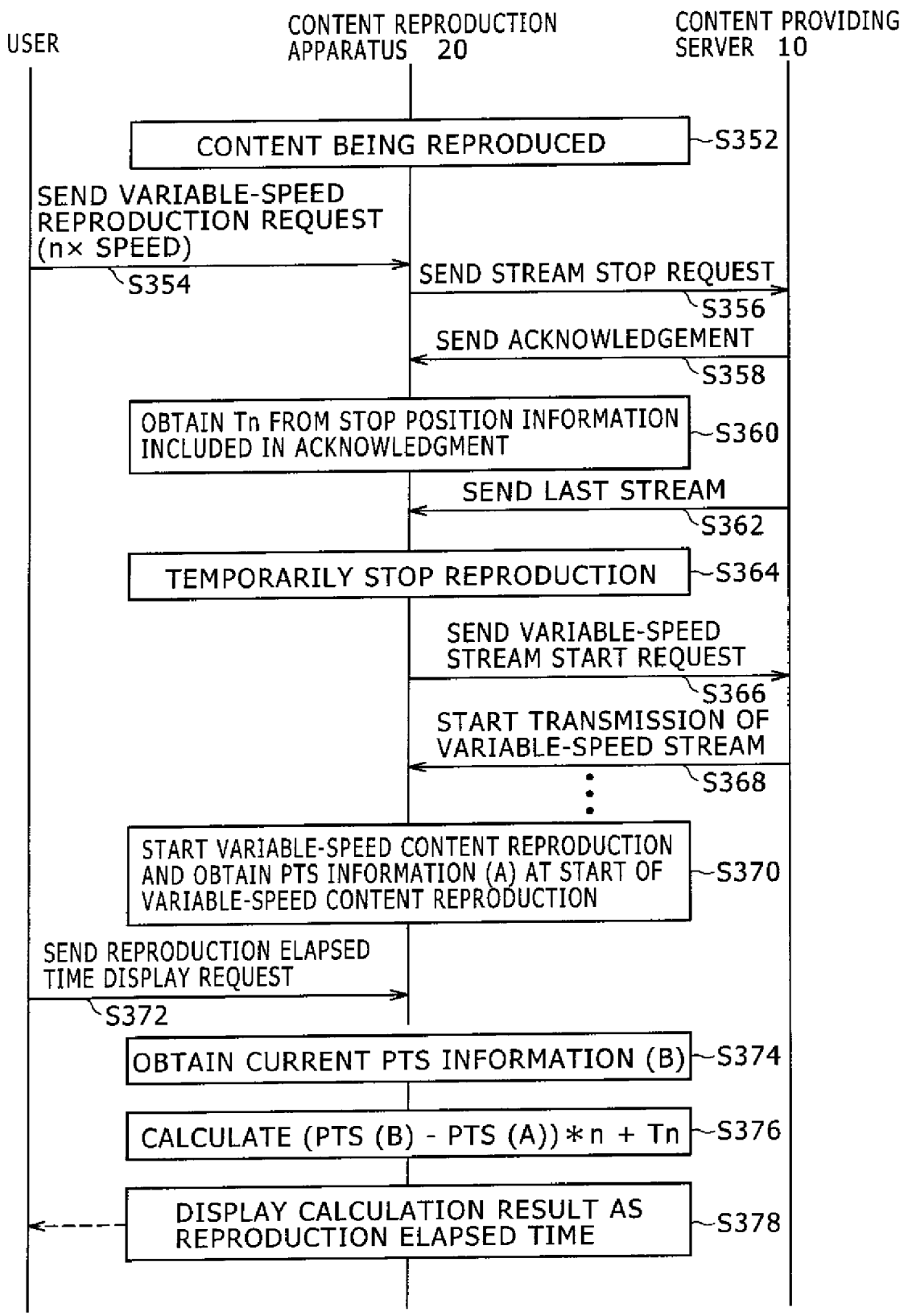
FIG. 11 is a sequence diagram showing a second content reproduction method performed in a content reproduction system.

FIG. 11 is a sequence diagram showing the second content reproduction method performed in the content reproduction system 1 according to embodiments consistent with the present invention. The content reproduction apparatus 20 may reproduce content at the normal speed while receiving the normal-speed reproduction streaming data from the content providing server 10 (S352). If an n×-speed reproduction request is then input by the user (S354), the content reproduction apparatus 20 may request the content providing server 10 to stop sending the normal-speed reproduction streaming data (S356).

The content providing server 10 may send an acknowledgement of the request from the content reproduction apparatus 20, to the content reproduction apparatus 20 (S358). The acknowledgement sent from the content providing server 10 may include content reproduction stop position information; that is, information indicating the normal-speed content reproduction time. The content reproduction apparatus 20 may obtain the normal-speed content reproduction time Tn from the stop position information included in the acknowledgement sent from the content providing server 10 (S360).

The content reproduction apparatus 20 may then receive the last piece of the normal-speed reproduction streaming data sent from the content providing server 10 (S362). The content reproduction apparatus 20 may temporarily stop the content reproduction (S364).

The content reproduction apparatus 20 may then request the content providing server 10 to start to send variable-speed reproduction streaming data corresponding to the n× speed (S366). If responding to the request from the content reproduction apparatus 20, the content providing server 10 may start to send variable-speed reproduction streaming data corresponding to the n× speed (S368).

The content reproduction apparatus 20 may start to reproduce the content at the n× speed based on the variable-speed reproduction streaming data corresponding to the n× speed. The reproduction time acquisition section 270 may obtain PTS information (A) included in a PES reproduced at the start of the variable-speed reproduction (S370).

If a reproduction elapsed time display request is input from the user (S372), the reproduction time acquisition section 270 may obtain PTS information (B) included in the PES currently reproduced (S374). The reproduction time acquisition section 270 may calculate the reproduction elapsed time according to an expression ((PTS(B)−PTS(A))*n+Tn) (S376). The content reproduction apparatus 20 may then display the reproduction elapsed time (S378) and the user can understand the content reproduction elapsed time.

[3-5] Flow of a Third Operation of the Content Reproduction Apparatus

A third content reproduction method performed in the content reproduction system 1 will be described with reference to FIG. 12.

FIG. 12 is a sequence diagram showing a third content reproduction method performed in the content reproduction system 1 according to some embodiments. First, if a content reproduction request is received (S402), the content reproduction apparatus 20 may request the content providing server 10 to start to send normal-speed reproduction streaming data (S404). If responding to the request of the content reproduction apparatus 20, the content providing server 10 may start to send the normal-speed reproduction streaming data (S406).

The content reproduction apparatus 20 may buffer the received normal-speed reproduction streaming data in the buffer 222. The reproduction time acquisition section 270 may obtain and hold TTS (A) specified in the top TS packet of the received streaming data (S408). The content reproduction apparatus 20 may then start normal-speed content reproduction based on the normal-speed reproduction streaming data (S410).

If a reproduction elapsed time display request is input from the user (S412), the reproduction time acquisition section 270 may obtain TTS (B) specified in the top TS packet in the buffer 222 (S414). The top TS packet in the buffer 222 may be a TS packet about to be sent to the reproduction section 230.

The reproduction time acquisition section 270 may calculate the reproduction elapsed time according to an expression ((TTS(A)−TTS(B))/fs−Δt) (S416), where "fs" is the clock frequency used to count up the TTS. The top TS packet in the buffer 222 may be reproduced after the demultiplexer 232 divides the TS packet into E streams and the respective decoders apply corresponding decode processing to the E streams. Therefore, the time obtained by just calculating "(TTS (A)−TTS (B))/fs" may not exactly equal the actual reproduction elapsed time.

For this reason, if a setting time Δt is subtracted from the time estimated from TTS (A) and TTS (B), a more valid content reproduction elapsed time can be obtained. Specifically, the setting time Δt may correspond to the delay time from the time a certain TS packet is located at the top of the buffer 222 to the time the TS packet is actually reproduced. Since the time required for processing performed in the demultiplexer 232 and the respective decoders does not vary much, the setting time Δt can be prepared in advance.

The content reproduction apparatus 20 may then display the reproduction elapsed time calculated by the reproduction time acquisition section 270 (S418), and the user can understand the content reproduction elapsed time. In this way, if the reproduction time acquisition section 270 calculates the reproduction elapsed time by using TTS instead of PTS information, software processing can be simplified.

FIG. 12 shows a case in which a reproduction elapsed time is calculated by using TTS if normal-speed reproduction is performed. However, even if variable-speed reproduction is performed or if normal-speed reproduction is switched to variable-speed reproduction, the reproduction elapsed time can be calculated by using TTS with the speed of the variable-speed reproduction being taken into account.

For example, the reproduction time acquisition section 270 may extract the difference between TTS specified in the top TS packet in the buffer 222, if normal-speed reproduction is stopped, and TTS specified in the top TS packet of the received normal-speed reproduction streaming data. The reproduction time acquisition section 270 can obtain the normal-speed content reproduction time based on the extracted difference.

Further, the reproduction time acquisition section 270 may extract the difference between TTS specified in the top TS packet of the received variable-speed reproduction streaming data and TTS specified in the current-top TS packet in the buffer 222. The reproduction time acquisition section 270 can obtain the variable-speed content reproduction time based on the extracted difference.

Further, the reproduction time acquisition section 270 can calculate a content reproduction elapsed time by adding a normal-speed content reproduction time to the time obtained by multiplying a variable-speed content reproduction time by the speed of the variable-speed reproduction. It may also be effective if the setting time Δt is further subtracted from this reproduction elapsed time.

[4] CONCLUSION

As described above, the content reproduction apparatus 20 according to embodiments consistent with the present invention may start to obtain variable-speed reproduction streaming data in response to a variable-speed reproduction request, and may start variable-speed content reproduction based on the variable-speed reproduction streaming data. Further, the reproduction time acquisition section 270 may calculate a normal-speed content reproduction time from time information. The time information may be calculated from PTS information specified in a PES located at a reproduction stop position of a normal-speed content reproduction, or TTS specified in a TS packet. The reproduction time acquisition section 270 may calculate a variable-speed content reproduction time from the difference between time information specified at the start position of variable-speed reproduction, and time information specified at the current position in the variable-speed reproduction.

Further, the reproduction time acquisition section 270 may calculate a reproduction elapsed time by adding a normal-speed content reproduction time to the time obtained by multiplying a variable-speed content reproduction time by the speed of the variable-speed reproduction. According to the content reproduction apparatus 20, the content reproduction elapsed time may be obtained even if variable-speed content reproduction is performed.

According to the above-described embodiments, a description has been given, for example, to a case in which normal-speed content reproduction may be switched to variable-speed content reproduction, but embodiments consistent with the present invention are not limited to this case. For example, the present invention is also applicable to situations in which variable-speed content reproduction is switched to normal-speed content reproduction. Moreover, the present situation is also applicable to situations in which the variable-speed reproduction rewinds the content in addition to forwarding the content.

Further, the present embodiments are also applicable to situations in which variable-speed content reproduction at a speed is switched to variable-speed content reproduction at another speed. In that case, the reproduction time acquisition section 270 can calculate the reproduction elapsed time by adding, for all variable speeds used, the value obtained by multiplying each variable-speed reproduction time by the corresponding reproduction speed.

Further, the steps of the processing of the content reproduction system 1, described herein, are not necessarily performed in chronological order along the procedures shown in the sequence diagrams. For example, the steps of the processing of the content reproduction system 1 may include processing to be performed in parallel or individually (for example, parallel processing or processing performed by an object).

Further, it is also possible to generate a computer program which allows the hardware such as the CPU 201, the ROM 202, and the RAM 203 included in the content reproduction apparatus 20 to function in the same way as the above-described components of the content reproduction apparatus 20. Further, a storage medium which stores the computer program may also provided. Such storage medium includes optical storage, magnetic storage, solid state storage, CD, DVD, hard disks, floppy disks, RAM, ROM, and flash memories. Further, if the function blocks shown in the function block diagram of FIG. 8 are configured by hardware, the series of processing can be implemented by hardware.

It should be understood by those skilled in the art that various modifications, combinations, sub-combinations and alterations may occur depending on design requirements and other factors insofar as they are within the scope of the appended claims or the equivalents thereof.

What is claimed is:

1. A content reproduction apparatus for reproducing variable-speed content, the content reproduction apparatus comprising:
   at least one processor;
   a data acquisition section for obtaining first streaming data and second streaming data, wherein the first streaming data includes first reproduction time data indicating a time to reproduce the first streaming data at a first streaming speed, and wherein the second streaming data includes second reproduction time data indicating a time to reproduce the second streaming data at a second streaming speed; and
   a reproduction time acquisition section, executing on the at least one processor, for obtaining a first reproduction time based on the first reproduction time data at a reproduction stop data position of the first streaming data, obtaining a second reproduction time based on a difference between the second reproduction time data at a start data position of the second streaming data and the second reproduction time data at a current data position of the second streaming data, and calculating a third reproduction time according to the first reproduction time data, the second reproduction time data, and a relationship between the first streaming speed and the second streaming speed, the third reproduction time being an amount of time to reproduce the first streaming data at the first streaming speed followed by the second streaming data at the second streaming speed; and
   a reproduction control section for, in response to a variable-speed reproduction request from a user, directing a reproduction section and the data acquisition section to stop reproducing the first streaming data, and to reproduce the second streaming data at the second streaming speed;
   wherein the reproduction time acquisition section obtains the third reproduction time by subtracting the first reproduction time to a time obtained by multiplying the second reproduction time by the second streaming speed.

2. A content reproduction apparatus according to claim 1, further comprising a reproduction section for reproducing the first streaming data at the first streaming speed and the second streaming data at the second streaming speed.

3. A content reproduction apparatus according to claim 1, wherein the first and second reproduction time data comprise a Presentation Time Stamp (PTS) or a Time Stamp in a transport packet.

4. A content reproduction apparatus according to claim 1, further comprising:
   a display section for displaying the third reproduction time.

5. The content reproduction apparatus according to claim 1, further comprising:
   a recording section for recording the first streaming data obtained by the data acquisition section in a storage medium.

6. A content reproduction apparatus according to claim 1, wherein the first and second reproduction time data comprise time stamp information specified in data packets of the first streaming data and the second streaming data.

7. A content reproduction apparatus according to claim 6, wherein:
   the reproduction time acquisition section obtains the second reproduction time based on a difference between time stamp information specified in packet data about to be reproduced and time stamp information specified in packet data corresponding to a start data position of the variable-speed reproduction.

8. A content reproduction method for reproducing variable-speed content, comprising:
   a processor, the processor configured for:
   obtaining first streaming data, wherein the first streaming data includes first reproduction time data indicating a time to reproduce the first streaming data at a first streaming speed;
   obtaining second streaming data, wherein the second streaming data includes second reproduction time data indicating a time to reproduce the second streaming data at a second streaming speed;
   obtaining a first reproduction time based on the first reproduction time data at a reproduction stop data position of the first streaming data;
   obtaining a second reproduction time based on a difference between the second reproduction time data at a start data position of the second streaming data and the second reproduction time data at a current data position of the second streaming data;
   obtaining a third reproduction time according to the first reproduction time data, the second reproduction time data, and a relationship between the first streaming speed and the second streaming speed, the third reproduction time being an amount of time to reproduce the first streaming data at the first streaming speed followed by the second streaming data at the second streaming speed;
   stopping reproduction of the first streaming data in response to a variable-speed reproduction request from a user; and reproducing the second streaming data at the second streaming speed;

wherein obtaining the third reproduction time includes adding the first reproduction time to a time obtained by multiplying the second reproduction time by the second streaming speed.

9. A content reproduction method according to claim 8, further comprising:

reproducing the first streaming data at the first streaming speed, and reproducing the second streaming data at the second streaming speed.

10. A content reproduction method according to claim 8, wherein the time information comprises a Presentation Time Stamp (PTS) or a Time Stamp in a transport packet.

11. A content reproduction method according to claim 8, further comprising:

displaying the third reproduction time.

12. The content reproduction method according to claim 8, further comprising:

recording the first streaming data.

13. A content reproduction method according to claim 8, wherein the first and second reproduction time data comprise time stamp information specified in data packets of the first streaming data and the second streaming data.

14. A content reproduction method according to claim 8, further comprising:

obtaining the second reproduction time based on a difference between time stamp information specified in packet data about to be produced and time stamp information specified in packet data corresponding to a start data position of the variable-speed reproduction.

15. A non-transitory computer-readable medium comprising instructions which, when executed by a processor, cause the processor to perform a content reproduction method, the method comprising:

obtaining first streaming data, wherein the first streaming data includes first reproduction time data indicating a time to reproduce the first streaming data at a first streaming speed;

obtaining second streaming data, wherein the second streaming data includes second reproduction time data indicating a time to reproduce the second streaming data at a second streaming speed;

obtaining a first reproduction time based on the first reproduction time data at a reproduction stop data position of the first streaming data;

obtaining a second reproduction time based on a difference between the second reproduction time data at a start data position of the second streaming data and the second reproduction time data at a current data position of the second streaming data;

obtaining a third reproduction time according to the first reproduction time data, the second reproduction time data, and a relationship between the first streaming speed and the second streaming speed, the third reproduction time being an amount of time to reproduce the first streaming data at the first streaming speed followed by the second streaming data at the second streaming speed;

stopping reproduction of the first streaming data in response to a variable-speed reproduction request from a user; and reproducing the second streaming data at the second streaming speed;

wherein obtaining the third reproduction time includes adding the first reproduction time to a time obtained by multiplying the second reproduction time by the second streaming speed.

16. A non-transitory computer-readable medium according to claim 15, the method further comprising:

reproducing the first streaming data at the first streaming speed, and reproducing the second streaming data at the second streaming speed.

17. A non-transitory computer-readable medium according to claim 15, wherein the time information comprises a Presentation Time Stamp (PTS) or a Time Stamp in a transport packet.

18. A non-transitory computer-readable medium according to claim 15, the method further comprising:

displaying the third reproduction time.

19. A non-transitory computer-readable medium according to claim 15, the method further comprising:

recording the first streaming data in a storage medium.

20. A non-transitory computer-readable medium according to claim 15, wherein the first and second reproduction time data comprise time stamp information specified in data packets of the first streaming data and the second streaming data.

21. A non-transitory content reproduction method according to claim 15, the method further comprising:

obtaining the second reproduction time based on a difference between time stamp information specified in packet data about to be produced and time stamp information specified in packet data corresponding to a start data position of the variable-speed reproduction.

* * * * *